United States Patent [19]
Whitehurst

[11] 3,754,741
[45] Aug. 28, 1973

[54] WATER TREATMENT SYSTEM

[75] Inventor: Chester M. Whitehurst, Atlanta; Frank D. Parker, Jr., Chamblee, both of Ga.

[73] Assignee: Parker Engineered Chemicals, Inc., Atlanta, Ga.

[22] Filed: Sept. 28, 1971

[21] Appl. No.: 184,464

[52] U.S. Cl.......... 261/151, 62/85, 137/3, 137/88, 137/101.11, 137/392, 137/563, 165/95, 210/97, 261/115, 261/DIG. 11, 261/DIG. 46
[51] Int. Cl............................................. C10k 1/08
[58] Field of Search ............... 261/3, 19, 20, 115, 261/117, 118, 127, 128, 151, DIG. 11, DIG. 46; 137/3, 88, 101.11, 114, 268, 392, 563; 165/31, 140, 95; 210/31, 97, 140

[56] References Cited
UNITED STATES PATENTS

| | | | |
|---|---|---|---|
| 2,780,357 | 2/1957 | Robinson ..................... | 261/151 X |
| 2,859,766 | 11/1958 | Shuldener ..................... | 137/268 |
| 2,984,991 | 5/1961 | Morgan ........................ | 62/121 |
| 3,094,133 | 6/1963 | Treanor ....................... | 137/101.11 |
| 3,196,892 | 7/1965 | Savage et al. .................. | 137/114 |
| 3,282,227 | 11/1966 | Hayman ........................ | 137/3 |
| 3,450,265 | 6/1969 | Kreusch et al. ................. | 210/140 |
| 3,627,032 | 12/1971 | Glad .......................... | 165/32 |

Primary Examiner—Dennis E. Talbert, Jr.
Attorney—Harold D. Jones, Jr., George M. Thomas et al.

[57] ABSTRACT

A water treatment system for large capacity air conditioning systems or similar heat exchange systems which include a water reservoir, a refrigeration unit, a cooling tower for spraying the water to the reservoir, and water flow means for moving the recirculating water from the reservoir through the refrigeration unit to the cooling tower, and back to the reservoir. Water makeup means is provided for adding additional fresh water to the reservoir, and a water drain system functions to drain away the stale water from the reservoir. Chemical additives pumps function to add chemical compositions to the recirculating water. The chemical additive pumps and water drain system function during the flow of recirculating water through the heat exchanger and during the flow of makeup water to the reservoir.

9 Claims, 3 Drawing Figures

Patented Aug. 28, 1973     3,754,741

Patented Aug. 28, 1973

WATER TREATMENT SYSTEM

BACKGROUND OF THE INVENTION

Large capacity air conditioning units usually comprise a water cooling system which functions to cool the refrigerant in a heat exchanger of the air conditioning unit. The cool water is usually directed from a reservoir through the heat exchanger of the air conditioning unit, and then to the upper end of a cooling tower where it is sprayed down through the cooling tower and falls back in the reservoir. A fan usually functions to flow air through the cooling tower, and the air helps to cool the water through evaporation of some of the water.

Water normally contains minerals and when water is evaporated from the water cooling system of an air conditioner as it flows down through the cooling tower, the minerals in the water are generally left behind and tend to accumulate in the water remaining in the reservoir. Furthermore, the spraying of the water causes the water to become saturated with oxygen. The minerals in the recirculating water eventually drop out of solution and form scale on the surfaces of the cooling tower and in the conduits of the heat exchanger and on the other flow surfaces of the system. The scale forms an insulating barrier and inhibits the transfer of heat at the heat exchanger and narrows the flow passageways of the flow conduits in the system. The oxygen in the water tends to react with the metal surfaces of the structure and to corrode and to otherwise deteriorate the structure, and the warm water of the system forms a breeding place for algae, bacteria, fungi, etc., which also tend to block the flow conduits of the system.

Because of these problems it has become customary to add chemical compounds in the recirculating water of the cooling tower of large capacity air conditioning systems. The chemicals used usually have included scale and corrosion inhibitors, and occasionally an algaecide. In the past, the automated devices utilized to add these chemicals to the recirculating water of the systems have usually included a pump for continuously pumping small quantities of liquid chemicals into the cooling tower water as the recirculating pump operated to flow water from the reservoir through the heat exchanger and to the spray means at the top of the cooling tower. The chemical pump thus ran continuously with the recirculating pump and without regard to the condition of the water in the cooling tower. In addition, the previous systems have used devices to bleed a portion of the recirculation water from the system so that the recirculating water would not become stale or saturated with large quantities of minerals and/or chemicals, and the recirculating water would be continually replaced with fresh water. The devices utilized to perform the water bleed function usually have embodied a bleed conduit which is opened by a valve in response to the operation of the recirculating pump. Thus, the bleeding of the stale water was slow and continuous and was routed through a relatively small valve opening which was easily blocked by debris in the water and rendered inoperative. Moreover, the dissipation of the recirculating water from evaporation and from the continuous bleeding function required intermittant replacement or makeup water to be added to the recirculating water in the reservoir. The makeup water usually was called for by a conventional float valve which was placed in the reservoir. The float valves frequently became damaged because of the turbulence of the air flowing through the cooling tower. On some occasions the float valves have malfunctioned so that they cause a continuous supply of makeup water to flow into the reservoir so as to overflow the reservoir or to terminate all flow of makeup water to the reservoir, allowing all of the recirculating water of the reservoir to drain through the bleed valve.

SUMMARY OF THE INVENTION

Briefly described, the present invention obviates the previously mentioned problems and comprises a water treatment system for the water circulation system of a large capacity air conditioning system and functions to maintain the recirculation water in the air conditioning system in a suitable condition for passage through the heat exchanger and into engagement with the flow surfaces of the air conditioning system without causing a reduction in the heat exchange capacity of the heat exchanger. Makeup water is added intermittently to the reservoir of the cooling tower of the water circulation system of the air conditioner to replace the water lost from evaporation, windage and the bleeding of the recirculation water, and chemicals are added to the recirculating water to treat the water. The chemicals are added only during the operation of the recirculating pump of the cooling tower and as the makeup water enters the reservoir. Thus, when the water level in the reservoir is low, which is when the concentration of minerals and oxygen is relatively high, fresh water and chemicals are added to the system to reduce the concentration of minerals, etc., in the recirculation water and to reduce their deleterious effects. If the atmospheric conditions change so that the frequency of water replenishment is reduced, the minerals left behind in the water due to evaporation of the water will be reduced a corresponding amount and the necessity of adding chemicals to the water also will be reduced a corresponding amount. Thus, the system functions to add chemicals to the water in response to the flow of makeup water to the system which normally corresponds to the concentration of minerals in the recirculation water. Therefore, no excessive amount of chemicals are added to the recirculation water and the water is not bled or discharged to the sewer system of the community except when necessary to adequately maintain the recirculating water of the system.

Thus, it is an object of this invention to provide a water treatment system for a water cooled air conditioning system which prolongs the life of the components of the system and which reduces the frequency of maintenance and repair of the system.

Another object of this invention is to provide a water treatment system for a heat exchanger which controls the composition of the recirculating cooling water which flows through the heat exchanger and reduces the formation of scale, oxides, algae, bacteria, etc., on the wet surfaces of the system.

Other objects, features and advantages of the present invention will become apparent upon reading the following specification when taken in conjunction with the accompanying drawing.

DESCRIPTION OF THE PREFERRED EMBODIMENT

Figure 1:
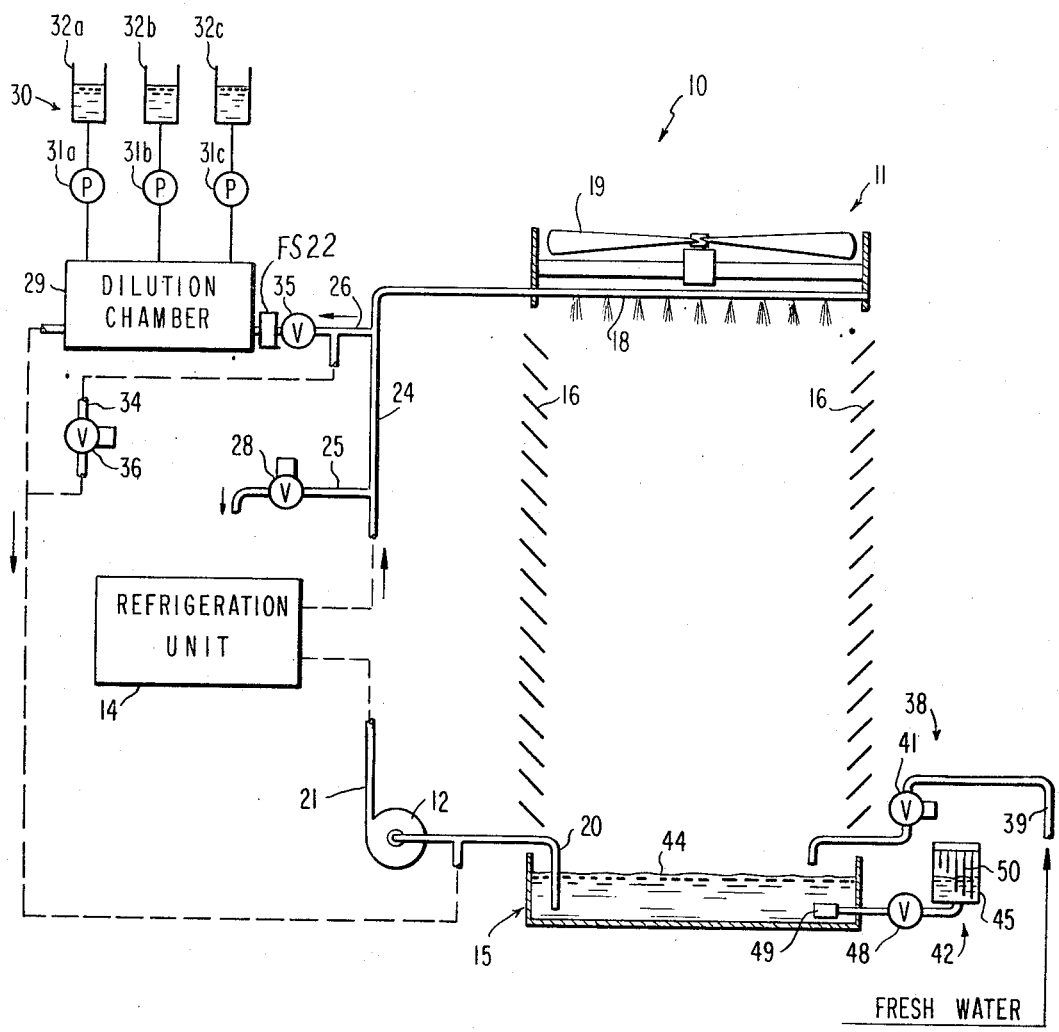
FIG. 1 is a schematic elevational view of a cooling system of a large capacity air conditioning system.

Referring now in more detail to the drawing, in which like numerals indicate like parts throughout the several views, FIG. 1 illustrates a water treatment system 10 for treating the recirculating water of a large capacity refrigeration unit, and comprises water cooling tower 11, recirculating pump 12, and refrigeration unit 14 which includes a heat exchanger (not shown). Water cooling tower 11 includes a reservoir 15, louvered sides 16, spray means 18 and fan 19. Recirculating pump 12 has its inlet conduit 20 immersed in reservoir 15 and functions as a part of a flow means to direct water from reservoir 15 through refrigeration unit 14 to spray means 18 at the upper end of the cooling tower 11. Fan 19 draws air into the louvered sides 16 of the cooling tower so as to cool the water flowing from spray means 18 to reservoir 15, by evaporation.

Pump outlet conduit 21 includes refrigeration unit 14, and conduit 24 which extends from the outlet of the heat exchanger of the refrigeration unit 14 to spray means 18 also includes branch conduits 25 and 26. Branch conduit 25 functions as a water drain conduit and is controlled by solenoid actuated drain valve 28. Branch conduit 26 functions as a bypass conduit and passes a portion of the recirculating water from the outlet of refrigeration unit 14 through flow switch 22 which detects the flow of water from pump 12, and through dilution chamber 29 and back to the inlet conduit 20 of pump 12. A plurality of chemical injection means 30 communicate with dilution chamber 29, and each chemical injection means comprises a diaphragm pump 31a, 31b and 31c and a container 32a, 32b and 32c filled with a chemical in liquid form. Pumps 31a, 31b and 31c function in a manner explained more fully hereinafter so as to inject slugs of the chemical compounds from containers 32a, 32b and 32c into dilution chamber 39. The recirculation water which flows through the dilution chamber 29 functions to thoroughly mix the slugs of chemical compounds in the recirculation water before the water is passed back through the main conduits of the system. By the time the mixture of chemical compounds and recirculation water leave dilution chamber 29, the chemical compounds are thoroughly mixed with the recirculation water.

In order to control the flow of water through dilution chamber 29, a second or alternate bypass conduit 34 bypasses dilution chamber 29 so that the recirculating water leaving conduit 24 divides and a part of the bypass water passes through dilution chamber 29 while the remaining part of the bypass water flows through alternate bypass conduit 34. Valves 35 and 36 function to regulate the flow of water through the bypass conduits. Also, valves 35 and 36 help control the flow of water through spray means 18.

Water makeup means 38 is connected to water cooling tower 11 at reservoir 15 and includes water makeup line 39, solenoid actuated on-off valve 41, and water level detector 42. Water level detector 42 is located exteriorly of water cooling tower 11 and is positioned at the desired level 44 of the recirculation water in reservoir 15. Water level detector 42 comprises a container or housing 45 that has at least one transparent side wall portion. The lower portion of container 45 is connected to reservoir 15 by means of conduit 46 which extends into the reservoir below the desired water level 44. On-off valve 48 controls the communication between container 45 and reservoir 15, and a strainer 49 is placed over the open end of conduit 46 in reservoir 15.

A plurality of electrodes 50 are suspended in container 45 and their lower ends terminate at various levels within the container. Container 45 is not airtight, so that the water in reservoir 15 tends to flow through conduit 46 and into container 45 until the level of the water in container 45 has attained a level corresponding to the level of the water in reservoir 15. As the level 44 of the water in the reservoir 15 increases or decreases, the level of water in container 45 will increase or decrease a corresponding amount by the flow of water back and forth through conduit 46 between reservoir 15 and container 45.

Figure 2A:
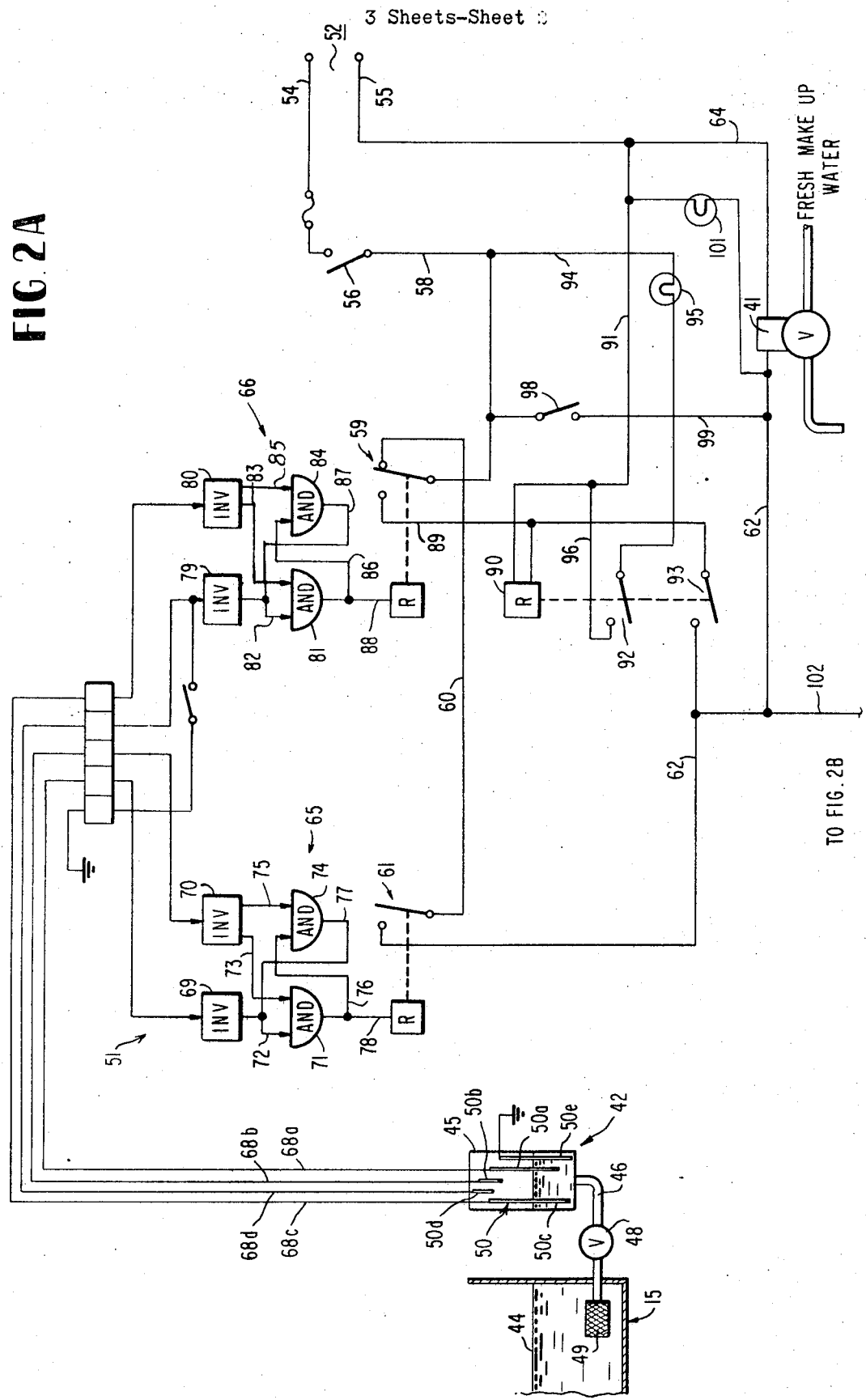
FIGS. 2a and 2b are electrical schematics of the control system for the cooling system of FIG. 1.

As is illustrated in FIG. 2a, the electrodes 50 in container 45 include a first low level electrode 50a, a first high level electrode 50b, a second low level electrode 50c, a second high level electrode 50d, and a reference electrode 50e. Control system 51 is electrically connected to the electrodes and includes a source of electrical power 52 with a hot line 54 and a common line 55. Power switch 56 connects the hot line 54 to conductor 58. Conductor 58 communicates through relay switch 59 with conductor 60. Conductor 60 is connected through relay switch 61 to conductor 62, through solenoid actuated on-off valve 41, to conductor 64, to common 55. Relays 59 and 61 are controlled by water level detector 42 so as to control the function of solenoid actuated on-off valve 41 and the flow of fresh makeup water to reservoir 15.

Relay 61 is controlled by primary water level control circuit 65, while relay 59 is controlled by secondary water level control circuit 66. First low-level electrode 50a is connected through its conductor 68a to inverter 69, while first high-level electrode 50b is connected through its conductor 68b to inverter 70. AND gate 71 is connected to inverter 69 by conductor 72 and to inverter 70 by conductor 73, while AND gate 74 is connected to inverter 70 through conductor 75. AND gate 71 is connected by means of conductor 76 to AND gate 74, and AND gate 74 is connected by means of conductor 77 to AND gate 71. AND gate 71 is connected to relay 61 by means of conductor 78.

Secondary water level control circuit 66 is similar to circuit 65 and includes inverters 79 and 80. Second low level electrode 50c is connected through its conductor 68c to inverter 80 while second high level electrode 50d is connected through its conductor 68d to inverter 79. Inverter 79 is connected to AND gate 81 by means of conductor 82, while inverter 80 is connected by means of conductor 83 to AND gate 81. AND gate 84 is connected to inverter 79 by means of conductor 85. AND gate 81 is connected to AND gate 84 by conductor 86 while AND gate 84 is connected to AND gate 81 by conductor 87. Conductor 88 connects AND gate 81 to relay 59.

Relay 59 is a double throw relay, and conductor 89 is connected to relay 90 and back to common through conductor 91. Relay switches 92 and 93 are controlled by relay 90, and switch 92 is connected to the power line 58 through conductor 94 and alarm light 95, and back to common through conductors 96 and 91. Relay switch 93 connects hot conductor 89 to conductor 62, through solenoid actuated on-off valve 41, through conductor 64 back to common 55.

Manual switch 98 in conductor 99 connects hot conductor 58 to conductor 62 and through solenoid actuated on-off valve 41. Conductor 100 is connected between conductor 62 and conductor 91 back to common, and makeup water indicator light 101 is positioned in conductor 100.

Figure 2B:
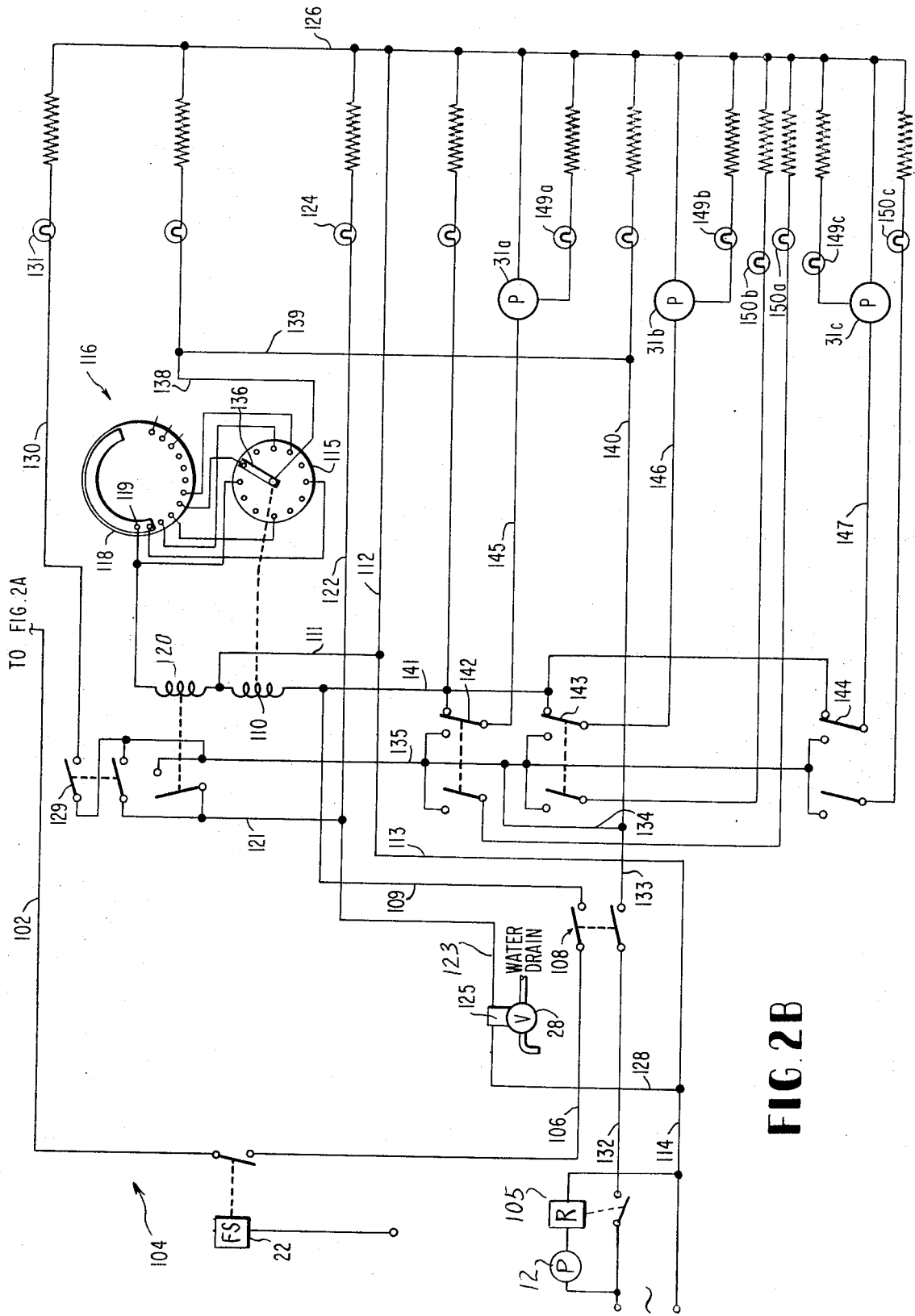

Conductor 102 extends from water level control system 51 (FIG. 2a) to chemical feed control system 104 (FIG. 2b). Relay 105 functions in response to the on or off condition of recirculating pump 12 in the water recirculating system of the water treatment system and is normally closed. Flow switch 22 in bypass conduit 26 (FIG. 1) functions to make and break connections in conductor 102. If there is a flow of water through the cooling water recirculation system of the air conditioning unit, flow switch 22 is closed to activate chemical feed control system 104 by connecting conductor 102 to conductor 106, which is one of the power supply conductors in the chemical feed control system 104. On-off power switch 108 connects conductor 106 with conductor 109, and makes a circuit through the coil 110 of a stepping relay of water bleed control circuit 116, through conductor 111, conductor 112, conductor 113, to common 114. Stepping relay 110 functions to step the rotary switch 115 of water bleed control circuit 116. Rotary switch 115 includes twelve contacts, and each contact of the rotary switch is connected to a contact of crescent switch 118. The number one contact 119 of crescent switch 118 is connected to relay 120, and the conductor 121 of the relay switch is connected in parallel through conductors 122 and 123 to bleed indicating light 124 and the solenoid 125 of water drain valve 28, respectively. Conductor 122 and its indicating light 124 are connected to common through conductors 126 and 112, 113 and 114, while conductor 123 is connected to common by conductors 128 and 114. Manual switch 129 extends in parallel across the switch of relay 120 to override this relay. Manual switch 129 is a double switch and is also connected to conductor 130, manual bleed indicating light 131, and back to common through conductors 126, 112, 113, and 114. The source of power for relay 120 and manual overriding switch 129 is derived from conductor 132, through power switch 108, and conductors 133, 134, and 135.

While only a few of the conductors are shown connected between rotary switch 115 and crescent switch 118, it will be understood that the contacts of these switches are connected together. For instance, the first contact 119 of crescent switch 118 is connected to the 12 o'clock position of rotary switch 115, the second contact of the crescent switch 118 is connected to the 6 o'clock position of rotary switch 115, the third contact of crescent switch 118 is connected to the 3 o'clock position of rotary switch 115, the fourth contact of crescent switch 118 is connected to the 9 o'clock position of rotary switch 115, and the fifth contact of crescent switch 118 is connected to the 1 o'clock position of rotary switch 115. The rotatable arm 136 of rotary switch 115 is sequentially stepped about the rotary switch through stepping relay 110, and the voltage for the arm 136 is derived from conductors 138, 139, 140, 133, through on-off power switch 108, and conductor 132. As the arm 136 is stepped about rotary switch 115, a circuit will be made to relay 120 so as to open water drain valve 28, depending upon the location of the crescent conductor of crescent switch 118.

Diaphragm pumps 31a, 31b and 31c are connected to a source of power through conductor 102 from water level control circuit, conductor 106, on-off power switch 108, conductor 109, conductor 141, manual switches 142, 143, 144, and conductors 145, 146 and 147. Each pump 31a, 31b and 31c includes an indicating light 149a, 149b and 149c, respectively. In addition, each pump 31a, 31b and 31c includes a manual operation indicator light 150a, 150b and 150c. The pumps and their indicating lights all receive power from conductor 141 when the switches 142, 143 and 144 are in their automatic positions as shown. When any of the manual switches are moved to their alternate or manual operating positions, the pumps and their indicating lights will receive power through conductors 135, 134, 133, on-off power switch 108, and conductor 132.

OPERATION

When the air conditioning system is placed in operation, recirculating pump 12 will function as part of a flow means to move water from reservoir 15 through the heat exchanger of refrigeration unit 14, an then up to spray means 18 at the upper portion of the cooling tower 11. Fan 19 functions to pull air in through the cooling tower and through the water spray, which causes the water to become cool through evaporation as it moves downwardly through the cooling tower. As the recirculating water in reservoir 15 dissipates, its level 44 decreases and the level of water in water level detector 42 also decreases. In order to replace the water in reservoir 15 valve 41 of water makeup means is opened. When the level of water in container 45 of the water level detector rises and contacts first upper level electrode 50b, signals will be carried from electrodes 50a and 50b through conductors 68a and 68b to inverters 69 and 70 of primary water level control circuit 65. Relay switch 59 which is controlled by secondary water level control circuit 66 will normally be in the position illustrated, so that power will be transmitted through on-off power switch 56, conductor 58, relay switch 59, conductor 60, to relay switch 61. The positive signals to inverters 69 and 70 will be inverted to no signals to AND gates 71 and 74. The result is that no signal will be passed to the coil of relay switch 61, whereupon the normally open contacts of relay switch 61 will be opened. This opens the circuit made to solenoid actuated water makeup valve 41, which causes the valve to become closed.

As the recirculation pump 12 functions to recirculate the water, and as the water in the cooling tower dissipates, the level 44 of the water in the cooling tower recedes. This causes a corresponding recession of the level of the water in container 45 of water level detector 42. Eventually the lower end of first upper level electrode 50b will be exposed, so that no signal is provided to inverter 70 through conductor 68b. Inverter 70 then provides a signal to AND gates 71 and 74; however, AND gate 71 is still not able to provide a signal to relay 61, and the relay switch does not change positions and solenoid controlled makeup valve 41 remains closed.

As the water level continues to recede in reservoir 15 and in water level detector 42, the lower end of first lower level electrode 50a becomes exposed, and no signal is provided to inverter 69 through conductor 68a. Both inverters 69 and 70 then function to provide signals to AND gates 71 and 74, and AND gate 71 then functions to give a signal to relay 61, causing the contact of relay 61 to close. This provides power to solenoid actuated water makeup valve 41, causing the valve to open and supply makeup water to reservoir 15.

As the water level rises in reservoir 15 and in container 45 of water level detector 42, first lower level electrode 50a will again be contacted with the water and provide a signal to its inverter 69. Since AND gate 71 provides a signal to AND gate 74 through conductor 76, and since AND gate 74 provides a signal to AND gate 71 through its conductor 77, there will be no change in the condition of AND gate 71 and the signal to relay 61 will be maintained. Thus, water continues to flow through makeup valve 41 to reservoir 15.

As the level of water continues to rise in reservoir 15, first upper level electrode 50b will again become contacted with the water in container 45 of water level detector 42. Thus, signals are provided from both electrodes 50a and 50b to inverters 69 and 70, whereupon the signals to AND gates 71 and 74 will terminate, breaking the signal to relay 61. This causes the contacts of the relay to separate and de-energize the solenoid of solenoid controlled makeup valve 41, cutting off the valve and terminating the flow of water to reservoir 15. This completes a cycle of the first mode of operation of the water level control system 51.

In the event that the first mode of operation or primary control circuit 65 malfunctions and fails to call for makeup water, the secondary circuit 66 and the second mode of operation of the circuit will become effective temporarily to deactivate the primary circuit and the second mode of operation will control solenoid actuated water makeup valve 41. For instance, if the primary control circuit 65 malfunctions and fails to open valve 41 after the wager in container 45 of water level detector 42 recedes below first low level electrode 50a, the water will continue to recede until it clears second low level electrode 50c. This causes no signals from electrodes from 50c and 50d to be transmitted through conductors 68c and 68d to inverters 79 and 80. The absence of signals from the electrodes causes the inverters 79 and 80 to emit signals to AND gates 81 and 84, causing a signal to be received by relay 59, whereupon the contacts of the relay 59 are shifted from the position shown to the opposite position where the power conductor 58 now is connected to conductor 89. The voltage through conductor 89 functions to close the contacts 92 and 93 of relay 90. Contacts 92 make a circuit from power conductor 58, conductor 94, through alarm light 95, through conductor 96, conductor 91, and back to common 55. The contacts 93 make a circuit from conductor 89, conductor 62, solenoid controlled makeup valve 41, and back to common. The alarm light 95 indicates that the control circuit is in its second mode of operation and the secondary circuit is functioning, and the solenoid actuated water makeup valve 41 is opened to replenish reservoir 15.

As the water in the reservoir rises, second low level electrode 50c is contacted by the water, and a signal is transmitted from the electrode through its conductor 68c to inverter 80; however, the holding circuit arrangement of inverters 79 and 80 and AND gates 81 and 84 functions to hold the signal to relay 59, to maintain the circuit through relay 90, to hold the second mode of operation.

As the level of water in water level detector 42 continues to rise and eventually contacts the lower end of second high level electrode 50d, the signal to inverter 80 is made, so that the holding circuit in the secondary circuit is lost and the relay switch 59 shifts positions. This causes the control circuit to be shifted back to its first mode of operation, and the primary water level control circuit 65 is activated again and will operate as previously described. Thus, secondary water level control circuit 66 functions to take over the control of the water level in reservoir 15 to correct a malfunctioning primary circuit and then to thrust the control back onto the primary circuit.

When flow switch 22 detects a flow of water through recirculating pump 12, it actuates and connects the chemical feed control system 104 to the water level control system 51. If a circuit is made to solenoid actuated makeup valve 41 through water level control circuit 51, a signal will be received in conductor 102 to actuate the chemical feed control system 104.

Under these conditions, and upon the closing of on-off power switch 108 and relay 105, chemical feed control system 104 will function to bleed some of the recirculating water from reservoir 15 and to operate chemical feed pumps 31a, 31b and 31c. The signal from conductor 102 is transmitted through conductors 109 and 141, through stepping relay 110 of water bleed control circuit 116, and conductors 111, 112, 113, and 114. As the movable arm 136 of rotary switch 115 is advanced upon each cycle of operation of solenoid actuated water makeup valve 41, a circuit is made from on-off power switch 108 through conductor 140, 139, and 138 through the rotary arm 136 of the rotary switch 115, and to the contacts of crescent switch 118. If the crescent-shaped contacter of crescent switch 118 is in contact with all of its contacts, relay switch 120 will be closed during every operation of solenoid actuated water makeup valve 41, and a circuit will be made from on-off switch 108, conductors 133, 134, 135, relay switch 120, conductor 121, the coil 125 of water drain valve 28, conductor 123, 128, and 114. Thus, the water will be drained or bled from the reservoir every time makeup water is added to the reservoir. If the crescent-shaped contacter of crescent switch 118 is in contact with less than all of its contacts, there will be some cycles of operation of solenoid controlled makeup valve 41 where no water is bled from bleed valve 28. Thus, bleed valve 28 can function during every cycle of operation of the fresh water makeup valve or during less than all of the cycles of this valve.

Pumps 31a, 31b and 31c are actuated upon each cycle of makeup water through solenoid actuated water makeup valve 41 by receiving a signal from conductors 102, 106, on-off power switch 108, conductor 109, conductor 141, and conductors 145, 146 and 147. Also, indicator lights 149a, 149b, and 149c will show an indication of the pulses of the diaphragm pumps 31a, 31b, and 31c, to indicate the frequency of the diaphragms of the pumps, which shows an indication of the volume of chemical compound being moved by the pumps as well as varifying pump operation. The amplitudes of the strokes of the diaphragms of the pumps 31a, 31b, and 31c are variable so that the volume of chemicals pumped can be varied.

When it is desired to operate the pumps 31a, 31b and 31c manually, any one or all of the switches 142, 143, and 144 can be shifted from their automatic positions as shown to their manual positions whereupon a circuit is made from conductor 132, on-off power switch 108, conductors 133, 134 and 135, and conductors 145, 146, and 147. In addition, the switches 142, 143, 144 make circuits to indicating lights 150a, 150b and 150c to show that the pumps have been placed in their manual operation modes.

From the preceding description it will be understood that: the chemical feed control system 104 functions to automatically or manually operate pumps 31a, 31b and 31c, and to automatically or manually operate the water drain valve 28; the water drain valve 28 can be programmed so as to bleed upon every cycle of operation of the fresh water makeup system, or during less than all of the cycles of the fresh water makeup system, depending upon the position of crescent switch 118; and the operation of the pumps will be prevented if the recirculating pump is turned off or the flow of water through the dilution chamber is restricted.

Also, the water feed control system 51 has its water level detector 42 located outside the confines of reservoir 15 so that the turbulence of the water in the reservoir does not affect the detection ability of the water level detector 42. Thus, the water level detector functions to maintain an accurate level of water in the reservoir in spite of windage, water turbulence, etc. Moreover, the first and second mode of operation of the water level control system enables the system to continue to function in spite of a malfunction of the primary control circuit, and an indication is given through the alarm light 95 to show that the system is in its secondary mode of operation. The maintenance man can then be called and the primary control circuit can be repaired or adjusted and the system continues to operate in the secondary mode of operation. Also, if the incapacity of the primary water level control circuit 65 is only temporary, the secondary water level control circuit functions to reactivate the primary water level control circuit.

While this invention has been described in detail with particular reference to preferred embodiments thereof, it will be understood that variations and modifications can be effected within the spirit and scope of the invention as described hereinbefore and as defined in the appended claims.

I claim:

1. A water treatment system comprising a water reservoir, a heat exchanger, spray means for spraying water to said reservoir, pump means for recirculating water from said reservoir through said heat exchanger and to said spray means, water makeup means responsive to the level of water in said reservoir for intermittently adding makeup water to said reservoir, water treating means responsive to the flow of water from said water makeup means to said reservoir and to the flow of recirculating water for treating the recirculating water, said water treating means including drain means for draining the recirculating water during less than all of the cycles of operation of said water makeup means, said water makeup means comprising a first mode of operation for maintaining the level of water in said reservoir between first predetermined low and high levels, and a second mode of operation for maintaining the level of water in said reservoir between second predetermined low and high levels.

2. The system of claim 1 and wherein said water makeup means comprises a container mounted externally of said reservoir at the desired level of water in said reservoir, a plurality of electrode members suspended in said container and terminating at their lower ends at different elevations, a first pair of said electrodes being operative to control the water level in said reservoir during the first mode of operation and a second pair of electrodes being operative to control the water level in said reservoir during the second mode of operation.

3. A water control system comprising a reservoir for water or the like, a heat exchange unit, spray means for spraying water to said reservoir, recirculating flow means for moving recirculating the water from said reservoir through said heat exchange unit and to said spray means, and water level control means responsive to the level of water in said reservoir and including first means for adding makeup water to said reservoir when the level of the water goes below a first low level and until the level of the water exceeds a first high level, and including second means for adding makeup water to said reservoir when the level of water goes below a second low level which is lower than said first low level and until the level of the water exceeds a second high level which is higher than said first high level.

4. The control system of claim 3 and wherein said water level control means comprises a container located outside said reservoir, in communication with said reservoir, and positioned at approximately the same height as the desired level of water in said reservoir so that the level of water in said container is the same as the level of water in said reservoir, and a plurality of electrodes suspended in said container with the lower ends of said electrodes being located at said first low level, first high level, second low level, and second high level.

5. The control system of claim 3 and wherein said water level control means comprises a container located outside said reservoir, in communication with said reservoir and positioned at approximately the same height as the desired level of water in said reservoir, said container including a transparent side wall portion, and a plurality of electrodes suspended in said container with their lower ends terminating at said first low level, first high level, second low level and second high level.

6. The system of claim 3 and further including water treatment means operative only during the flow of recirculating water and during the flow of makeup water to said reservoir for adding chemicals to the recirculating water.

7. A water treatment system comprising a water reservoir, a heat exchanger, spray means for spraying water to said reservoir, recirculating water flow means for moving recirculating water from said reservoir through said heat exchanger to said spray means, and water treating means responsive to the flow of recirculating water to add chemicals to the recirculating water, said water treating means comprising a bypass flow line communicating at one of its ends with the outlet of said heat exchanger and at its other end with the inlet of said heat exchanger, a mixing chamber in said bypass flow line, and at least one chemical pump having its outlet communicating with said mixing chamber and arranged to inject a chemical into the water flowing through the mixing chamber.

8. In a cooling tower system for an air conditioner or the like comprising a water reservoir, a heat exchanger, spray means for spraying water to said reservoir and flow means for recirculating water from said reservoir through said heat exchanger and to said spray means, the improvement comprising water makeup means including a first mode of operation responsive to the depletion of water in said reservoir below a first low level for starting the flow of makeup water to said reservoir and for terminating the flow of makeup water when it exceeds a first high level, and a second mode of operation responsive to the depletion of water in said reservoir below a second low level below the first low level for deactivating the first mode of operation and for starting the flow of makeup water to said reservoir and for terminating the flow of makeup water when it exceeds a second high level which is higher than the first high level and for shifting back to the first mode of operation.

9. The system of claim 8 and further including chemical additive means arranged to inject chemicals into the recirculating water and the flow of makeup water to said reservoir.

* * * * *